Patented July 14, 1931

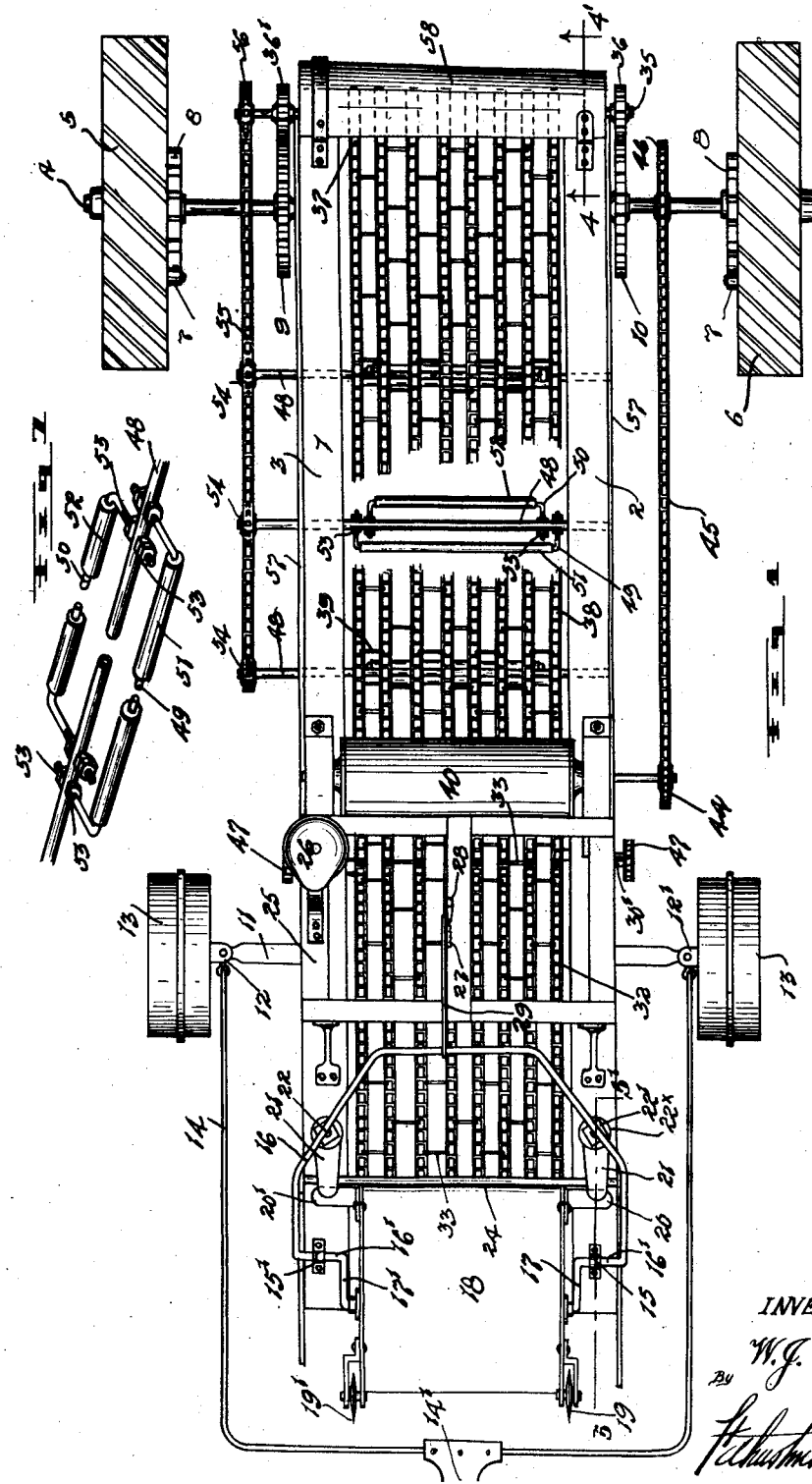

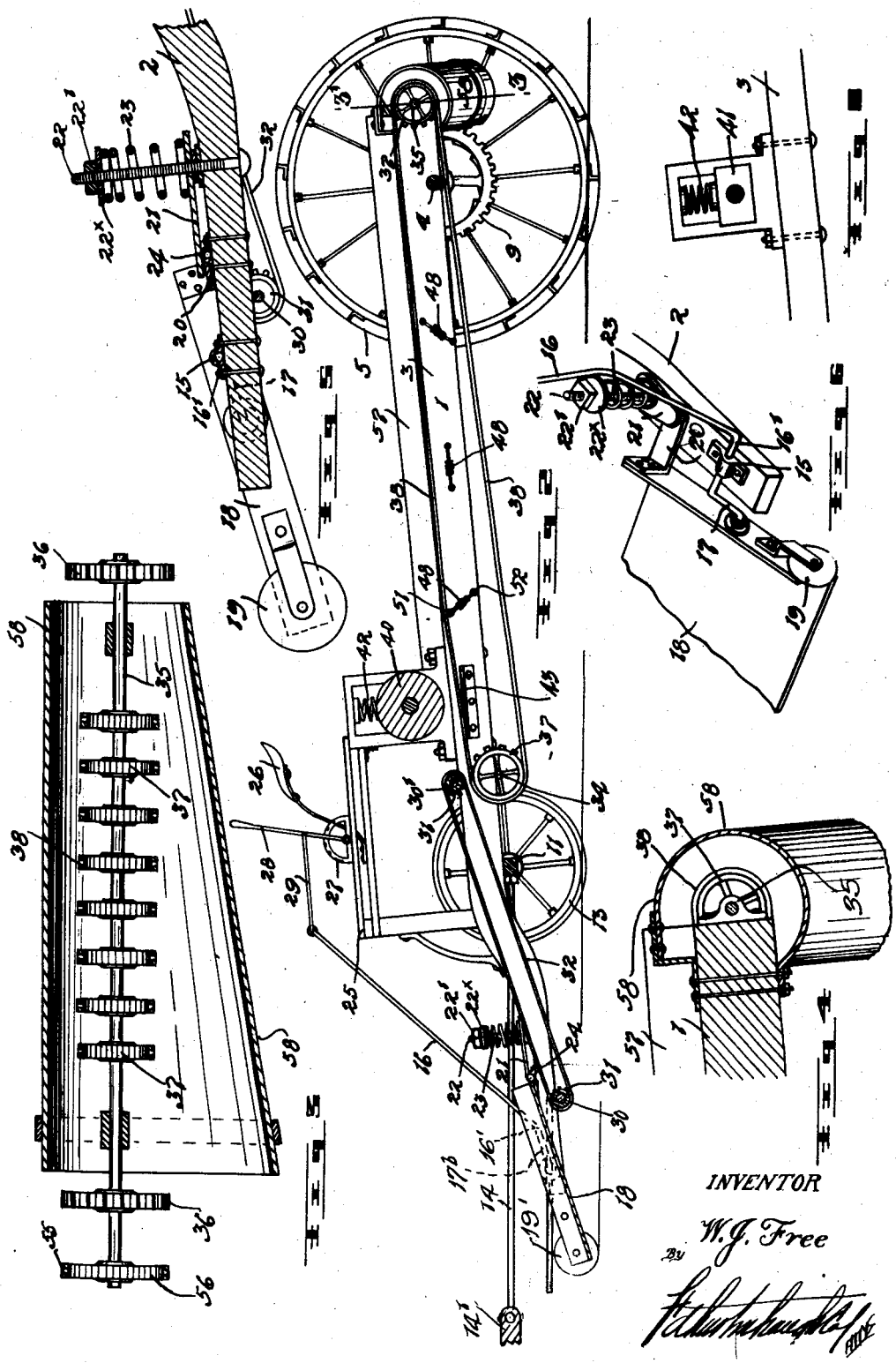

1,814,029

UNITED STATES PATENT OFFICE

WILLIAM JOHN FREE, OF NEEPAWA, MANITOBA, CANADA

COMBINED WEEDER AND CULTIVATOR

Application filed April 17, 1929. Serial No. 355,917.

The invention relates to improvements in combined weeders and cultivators and an object of the invention is to provide a machine for eradicating weeds and at the same time cultivating the land, the machine being specially advantageous for destroying couch grass.

A further object is to provide a machine which when in operation will cut a strip of land to a desired depth, elevate the strip and break the lumps to loosen the weeds, agitate the broken earth, separate the weeds therefrom and redeposit the broken earth on the land surface free of weeds and deposit the weeds in wind rows on the field clear of the earth deposited by the machine.

A further object of the invention is to provide a machine with open mesh conveyors for handling the earth which will permit of the clearing through of the earth and retaining of the weeds and also to associate with one of the conveyors, means for crushing the lumps of earth as they pass onto the conveyor and also means for agitating the top side of the conveyor to insure of an effective separation of the weeds from the earth.

A still further object of the invention is to provide an adjustable shovel for digging the earth and discharging it to the conveyors and to associate coulters with the shovel adapted to cut the earth into strips.

A still further object of the invention is to provide a construction which will permit the shovel to upset should it meet with a damaging obstruction such as a root or heavy stone and such that the shovel can be readily reset after the obstruction has been passed.

A further object is to provide a machine which can be readily controlled by a single attendant and which can be readily steered over the field as the work proceeds.

With the above more important and other minor objects in view which will become more apparent as the description proceeds, the invention consists essentialy in the arrangement and construction of parts hereinafter more particularly described, reference being had to the accompanying drawings, in which:—

Fig. 1 is a plan view of the machine, certain parts being broken away to expose construction.

Fig. 2 is a vertical sectional view longitudinally and centrally through the machine.

Fig. 3 is an enlarged detailed vertical sectional view at 3—3' Figure 2.

Fig. 4 is an enlarged detailed vertical sectional view at 4—4' Figure 1.

Fig. 5 is an enlarged detailed vertical sectional view at 5—5' Figure 1.

Fig. 6 is a perspective view of a portion of the shovel or dipper and adjacent parts.

Fig. 7 is a perspective view of the beaters.

Fig. 8 is a side view of the spring pressed bearing utilized for the roller or crusher.

In the drawings like characters of reference indicate corresponding parts in the several figures.

The main frame 1 of the machine embodies side beams 2 and 3 which are provided rearwardly with suitable bearings for the rear axle 4 on which the traction wheels 5 and 6 are rotatably mounted. The wheels drive the axle through gravity pawls 7 attached to the wheels and continuously engaged with ratchet wheels 8 secured to the axles, this latter arrangement permitting of the ready turning of the machine whilst driving as will be readily understood.

To the axles, I secure permanently gear wheels 9 and 10 which are utilized to drive the endless conveyor later described. The forward end of the frame has secured thereto the front axle 11, the ends of which are provided with pivoted steering spindles 12 and 12' on which the front carriage wheels 13 are rotatably mounted. The spindles are connected by a U-shaped draft bar 14 to which the steering tongue 14' is fastened.

The draft animals are hitched to the front ends of the frame beams and are positioned at opposite sides of the tongue and steer the same.

The forward ends of the beams 2 and 3, which it will be observed extend considerably in advance of the front axle and have such forward portions thereof fairly close to the ground, carry two opposing bearings 15 and 15' which support rotatably the inturned portions 16' of a bail bar 16 and the inturned portions 16' carry similar cranks 17, 17' which pivotally support the shovel or dipper 18 being suitably attached to the sides thereof. The dipper is adapted to dig the soil to the desired depth and obviously the body of the dipper can be raised or lowered by swinging the bail bar. The front end of the dipper is provided at the sides with similar rotatably mounted disc coulters 19 and 19' which are adapted to cut the soil as the machine advances.

The rear end of the dipper is provided with a pair of outstanding lugs 20 and 20', these lugs overlying the beams 2 and 3 and each lug underlies the forward end of a catch plate or bar 21 which has the rear end mounted on a vertically disposed bolt 22 permanently carried by the frame beam. The upper end of the bolt is fitted with a nut 22' and a washer 22$^\times$ and a coiled spring 23 extends between the washer and the bar. Obviously by adjusting the nut, I can adjust the pressure on the lugs and in so doing regulate the dipping of the shovel by engagement with an obstruction such as a stone or root.

It will be apparent that should the front end of the shovel strike an obstruction which might damage it, the obstruction will operate to turn the shovel in a counter clockwise direction on the cranks, the lugs escaping from the catch bars at such time. The operator will adjust the springs so that they will hold the shovel against dipping for normal working conditions. The upper end of the shovel in normal position butts a cross rod 24 carried by the beams 2 and 3.

The front end of the machine carries an elevated frame work 25 which supports the driver's seat 26 and to this frame work, I fasten a quadrant 27 supplied with side notches engaged by a lever 28 pivotally attached to the base of the quadrant. The lever is connected by a link 29 to the bail bar 16 and the notches of the quadrant are so arranged that the lever is held against forward movement by the teeth but is free to slide rearwardly. In actual practice, the lever will be continuously held pressed towards the quadrant. By pulling the lever rearwardly, one raises the forward end of the dipper and the depth of cut of the dipper will be regulated by setting the lever as desired, it being understood that the lever is advanced by shoving it forcibly away from the quadrant and passing it ahead to the desired notch. When the dipper or shovel is working, the pressure of the earth is causing a down thrust on the crank and consequently a forward pull on the bail bar and this is arrested by the lever engaging with the quadrant.

In a location underlying the rear end of the dipper, the frame carries a cross shaft 30 and in a location approximately underlying the driver's seat, the frame supports a second cross shaft 30'. The cross shafts are supplied at intervals with similar chain wheels 31 connected by endless chains 32, the adjacent chains being connected by intervening links 33. Such construction provides an open forward inclined conveyor receiving the earth and roots dug by the shovel and discharging them rearwardly, the loose earth falling through and the larger lumps and weeds such as couch grass being carried rearwardly by the conveyor.

Underneath the shaft 30' the frame supports rotatably a further cross shaft 34 and rearwardly the frame carries a cross shaft 35 which latter cross shaft is fitted at the ends with pinions 36 and 36' meshing continuously with the driving gears 9 and 10. The shafts 34 and 35 are both provided within the frame with chain wheels 37, the chain wheels being connected by endless chains 38 and the adjacent chains being attached one to the other by intervening links 39. This construction provides a rear main conveyor receiving the material discharged from the front conveyor and also forming a screen for separating the weeds from the earth.

Directly above the forward end of the main conveyor, I locate a roller or crusher 40 which is suitably carried by the side beams of the frame and is carried by end bearings 41 pressed downwardly by associated springs 42, the arrangement being such that the roller will break a normal sized lump but can clear to permit damaging obstructions to go through. A plate or table 43 is placed underneath the upper side of the main conveyor chains in a location directly underneath the roller, this plate forming a permanent base to hold the passing material being crushed by the roller. The roller shaft is provided with a chain wheel 44 driven by a chain 45 from a chain wheel 46 secured to the rear axle. The forward end of the main conveyor drives the rear end of the forward conveyor through chains 47 provided.

In order to shake out and loosen the earth from the weeds such as couch grass, I have considered it desirable to utilize beaters to strike the back moving or top side of the chains of the main conveyor. I have herein shown three similar beaters.

Each beater comprises a cross shaft 48 rotatably carried by the side beams of the frame and to the shaft I adjustably fasten the inturned ends of cross rods 49 and 50, the cross rods being spaced from the shaft and at diametrically opposite sides thereof and being fitted with rollers 51 and 52. The adjusting nuts 53 associated with the rods allow me to set the rollers as desired radially from the shaft and by so doing increase or diminish the beating action. The shafts 48 are all fitted with similar chain wheels 54 and the chain wheels are all engaged by an endless chain 55 which is driven by a chain wheel 56 secured to the rear shaft 35.

Obviously when the machine is working, the beater shafts will be rotated and as they turn, the rollers 52 will strike the chains 38 and serve to separate the earth from the weeds. The beaters are varied in position so that they do not all strike at the same time. The main frame carries upstanding side shields 57 which retain the passing dirt and weeds on the rear conveyor.

Rearwardly of the machine the main frame carries a transversely extending inclined chute 58 adapted to receive the weeds discharging from the rear end of the main conveyor and to deposit those weeds in a wind row on the field so that they can be subsequently readily collected and destroyed.

This machine is particularly designed for eradicating couch grass and when in operation cuts and digs the soil, separates the couch grass from the earth, the earth being effectively broken and agitated to loosen the couch grass and the earth being returned to the land in a pulverized condition while the couch grass is deposited on the surface of the field.

What I claim as my invention is:—

1. In a combined weeder and cultivator, a portable frame, an adjustable ground engaging shovel located at the forward end of the frame, driven conveyors carried by the frame and adapted to receive the earth dug by the shovel and direct the same rearwardly, said conveyors being constructed to permit the earth to fall through and the weeds to be carried back thereby, means carried by the frame for crushing the earth as it moves backwardly and means carried by the frame for collecting and discharging laterally the weeds discharging at the rear end of the machine.

2. In a combined weeder and cultivator, a wheeled frame, an inclined adjustable earth digging shovel located at the forward end of the frame, an inclined driven conveyor carried by the forward part of the frame and having the forward end thereof underlying the rear end of the shovel, a main driven conveyor carried by the main frame and having the forward end thereof underlying the rear end of the other conveyor and the rear end thereof discharging at the rear end of the frame, said conveyors being of an open mesh construction to permit the earth to fall through and the weeds to be retained and carried rearwardly, means carried by the frame for crushing the earth delivered onto the forward end of the main conveyor, driven beaters carried by the main frame and engaging with the top side of the main conveyor to agitate the same and loosen the earth from the weeds and means for collecting and laterally discharging the weeds discharged from the rear end of the main conveyor.

3. In a combined weeder and cultivator, an endless horizontally disposed driven conveyor of open mesh construction, means for delivering dug earth onto the forward end of the conveyor at the front end thereof, a stationary plate underlying the top side of the conveyor at the front end thereof, a crushing roller overlying the conveyor in a location above the plate and adapted to break the earth as it moves backwardly on the conveyor and driven beaters underlying the top side of the conveyor and disposed throughout the length thereof and adapted to intermittently strike the conveyor to agitate the same and effect the separation of the weeds from the earth.

4. In a combined weeder and cultivator, an endless horizontally disposed driven conveyor of open mesh construction, means for delivering dug earth onto the forward end of the conveyor at the front end thereof, a stationary plate underlying the top side of the conveyor at the front end thereof, a crushing roller overlying the conveyor in a location above the plate and adapted to break the earth as it moves backwardly on the conveyor, driven beaters underlying the top side of the conveyor and disposed throughout the length thereof and adapted to intermittently strike the conveyor to agitate the same and effect the separation of the weeds from the earth and a chute located at the rear end of the conveyor and adapted to receive the weeds discharged thereby and discharge the same laterally.

5. In a combined weeder and cultivator, the combination with a main frame, of an inclined earth digging shovel pivotally suspended centrally of its length from the frame, lugs secured to the rear corners of the shovel and overlying the frame and downwardly spring pressed catch plates carried by the frame and overlying the lugs, said catch plates preventing over turning of the shovel under normal digging pressure.

6. In a combined weeder and cultivator, the combination with a main frame, of an inclined earth digging shovel pivotally suspended centrally of its length from the frame, lugs secured to the rear corners of the shovel and overlying the frame, vertically extending bolts secured to the frame, said bolts being provided at their upper ends with adjusting nuts, catch plates mounted on the bolts and having their forward ends overlying the lugs and springs interposed between the nuts and the catch plates.

7. In a combined weeder and cultivator, the combination with a supporting frame, of opposing cranks pivotally carried by the frame, an earth digging shovel pivotally supported centrally of its length by the cranks, means releasably connecting the rear end of the shovel to the frame, said means holding the shovel against over turning under normal digging pressure and means for simultaneously turning the cranks to raise or lower the front end of the shovel.

Signed at Neepawa, Manitoba, this 12th day of January, 1929.

WILLIAM JOHN FREE.